United States Patent Office 3,157,660
Patented Nov. 17, 1964

3,157,660
PRODUCTION OF ALPHA,BETA-UNSATURATED NITRILES
Walter Stilz and Horst Pommer, Ludwigshafen (Rhine), Germany, assignors to Badische Anilin- & Soda-Fabrik Aktiengesellschaft, Ludwigshafen (Rhine), Germany
No Drawing. Filed Mar. 2, 1960, Ser. No. 12,260
Claims priority, application Germany, Mar. 4, 1959, B 52,337
3 Claims. (Cl. 260—283)

This invention relates to a process for the production of alpha,beta-unsaturated nitriles in a way not hitherto described. More specifically, the invention relates to a process for the production of alpha,beta-unsaturated nitriles by uniting two compounds, the linkage being effected by a C—C linkage which is formed instead of a C—O linkage. The invention also relates to new and valuable alpha,beta-unsaturated nitriles.

It is known that alpha,beta-unsaturated nitriles can be obtained by catalytic dehydrogenation of the corresponding saturated nitriles. This method is successful however only with the lower members, as for example with propionitrile, and even in these cases often only with unsatisfactory yields.

According to another known method, alpha,beta-unsaturated nitriles are obtained by reaction of carbonyl compounds with nitriles which have a sufficiently activated methylene group adjacent to the nitrile group. These reactions are however dependent in a high degree on steric conditions and are not successful in all cases. Furthermore the initial materials are often accessible only with difficulty and the yields are as a rule unsatisfactory.

The alpha,beta-unsaturated nitriles may also be prepared by reaction of alpha-chlornitriles with carbonyl compounds in a Reformatzki reaction and by subsequent dehydration of the reactio nproduct. This process has the disadvantage that absolute solvents are necessary. It is quite impossible to carry out such reactions in water. Moreover on a commercial scale, such reactions are difficult to control.

It is an object of this invention to provide a process according to which higher alpha,beta-unsaturated nitriles are accessible in good yields. Another object of the invention is to provide a process for the production of alpha,beta-unsaturated nitriles which is substantially independent of the steric conditions of the initial materials. A further object of the invention is to provide a process in which no absolute solvents are necessary and which can even be carried out in water.

According to the present invention, the said objects are achieved by reacting with a carbonyl compound selected from the groups consisting of aldehydes and ketones a compound of the general formula:

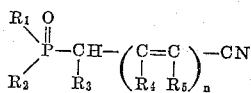

I in the presence of a proton acceptor and preferably in a solvent which is inert under the reaction conditions. In the above formula $R_1$ represents an aliphatic, cycloaliphatic or araliphatic radical attached by way of an oxygen atom, $R_2$ may have the same significance as $R_1$ but may also represent an aliphatic, cycloaliphatic, araliphatic or aromatic radical, $R_1$ and $R_2$ may also be common members of a heterocyclic ring which may be substituted and which includes the phosphorus atom and two oxygen atoms directly attached to the phosphorus atom, $R_3$, $R_4$ and $R_5$ represent hydrogen atoms or lower alkyl radicals with up to 4 carbon atoms, and $n$ stands for zero, 1, 2, 3 or 4.

As a rule, the said aliphatic, cycloaliphatic or aromatic radicals are alkyl, cycloalkyl, aralkyl or aryl radicals. In the preferred initial materials of the Formula I, $R_1$ represents a lower alkyl radical with up to 4 carbon atoms and $R_2$ a lower alkyl radical with up to 4 carbon atoms or an aryl radical, which may be substituted by groups or atoms which are inert under the conditions of the process, such as halogen atoms or alkoxy groups. Of the compounds in which $R_2$ represents an aryl radical, possibly substituted, it is advantageous to use the phenyl compound, possibly substituted. $R_3$, $R_4$ and $R_5$ in the preferred initial materials of the Formula I represent hydrogen atoms or methyl groups. $n$ preferably has the meaning zero, 1 or 2.

For example the reaction of beta-ionone with cyanomethylphosphonic acid diethyl ester (also called phosphonic acetonitrile) to form beta-ionylidene acetonitrile (an important intermediate product for the synthesis of carotenoids) in the presence of sodium methylate as proton acceptor may be formulated as follows:

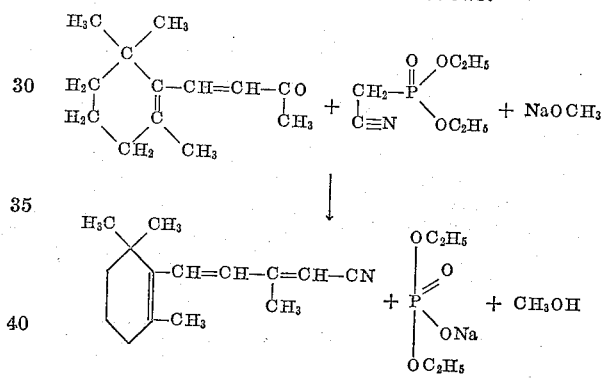

Compounds of the general Formula I which are suitable for the process include cyanomethylphosphonic acid diethyl ester, alpha-cyanoethylphosphonic acid diethyl ester, alpha-cyanotolylphosphonic acid diethyl ester, cyanomethylphosphonic acid dimethyl ester, cyanomethylphosphonic acid dibutyl ester, cyanomethylphosphonic acid ethylene glycol ester, cyanomethylphosphonic acid-1,3-propane-diol ester, 3-cyano-2-methyl-propene-(2)-yl-phosphonic acid diethyl ester, 5-cyano-4-methyl-pentadiene-(2,4)-yl-phosphonic acid diethyl ester, cyanomethyl-phenyl-phosphinic acid ethyl ester, cyanomethyl-ethyl-phosphinic acid butyl ester, 3-cyanopropen-(2)-yl-phosphonic acid dimethyl ester, 7-cyano-2,6-dimethyl-heptatrien-(2,4,6)-yl-phosphonic acid diethyl ester and cyanomethyl-phosphonic acid propyl ester.

Thus, the initial materials of Formula I are phosphonic acid esters (or phosphonates) or phosphinic acid esters (or phosphinates). The former contain in the case of using the methyl esters the characteristic grouping

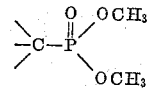

and the later the characteristic grouping

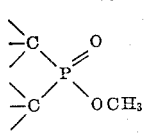

The phosphonates, of which only a few have been described heretofore, may be prepared by reaction of a halogen nitrile, which may be substituted, with a phosphorous acid ester (or phosphite). This reaction is known as the Arbusov reaction. Suitable halogen nitriles include chloracetonitrile, gamma-brom-beta-methyl-crotononitrile, omega-brom-beta-methyl-sorbic nitrile, gamma-brom-crotononitrile, 1 - cyano - 7 - brom - 2,6 - dimethyl - heptatriene - (1,3,5) and 1 - cyano - 7 - brom - 1,5 - dimethyl-heptatriene-(1,3,5).

Suitable phosphorous acid esters include trimethyl phosphite, triethyl phosphite, tripropyl phosphite, tributyl phosphite, tricyclohexyl phosphite and tribenzyl phosphite.

The phosphinates of the Formula I used as initial materials are obtained in the usual way by reaction of the said halogen nitriles with phosphonites, for example with phenyl-bis-ethoxyphosphine, para-tolyl-diethoxyphosphine or methyl-diethoxyphosphine.

Compounds of the Formula I in which $n$ is equal to zero and in which the alpha-position to the cyano group is substituted may be obtained by reaction of the corresponding alpha-halogen nitriles. Thus for example 1-cyanoethylphosphonic acid-(1)-diethyl ester is obtained from alpha-chloropropionitrile and triethyl phosphite. The same compound is also obtained however by reaction of chloracetonitrile with triethyl phosphite and methylation of the cyanomethylphosphonic acid diethyl ester thus formed in the usual way, for example by the action of methyl iodide or dimethyl sulfate on cyanomethylphosphonic acid diethyl ester which has been metalated for example with potassium-tert.-butylate.

Suitable compounds containing carbonyl groups include formaldehyde, acetaldehyde, propionaldehyde, butyraldehyde, isobutyraldehyde, acrolein, alpha-methylacrolein, crotonaldehyde, hexadienal, octatrienal, benzaldehyde, para-nitrobenzaldehyde, 2,6-dichlorbenzaldehyde, piperonal, paradimethylaminobenzaldehyde, 9-fluorenone, terephthalic dialdehyde, anthraquinone-2-aldehyde, 1-naphthaldehyde, salicylaldehyde, 9-chloranthracene, 2-ethoxynaphthalene-1-aldehyde, furfurol, pyridine-(2)-aldehyde, pyridine-(3)-aldehyde, pyridine-(4)-aldehyde, quinoline-(2)-aldehyde, quinoline-(4)-aldehyde, anthracene-(9)-aldehyde, cinnamaldehyde, phenylacetaldehyde, acetone, butyrone, methyl ethyl ketone, cyclocitral, alpha-ionone, beta-ionone, pseudo-ionone, cirtal, glyoxylic acid, glyoxylic acid esters, glyoxal, glycol aldehyde, etherified or esterified glycol aldehydes, acetoacetic acid esters, oxomalonic esters, oxalacetic esters, phenyl-pentadienal, beta-alkoxyacroleins, for example beta-ethoxyacrolein and alpha - methyl - beta - ethoxyacrolein, alpha - methyl - beta - acetoxyacrolein, alpha - methyl - beta - chloracrolein, vinyl methyl ketone, beta-chlorvinyl methyl ketone, beta-methoxyvinyl methyl ketone, chloracetaldehyde, beta-formaylacrylic acid, beta-formylacrylic acid esters, beta-formylcrotonic acid esters, propargylaldehyde, butinone, 4,4 - dihydroxyethylene - pentene-(3) - al - (1), 4 - acetoxy - pentene - (3) - al - (1), maleic dialdehyde, tetrolaldehyde, 5-acetoxy-4-methyl-pentadiene - (2,4) - al - (1), 5 - ethoxy - 4 - methyl - pentadiene - (2,4) - al - (1), 5 - carbmethoxy - 4 - methyl-pentadiene - (2,4) - al - (1), 5 - methoxy - 4 - methyl-pentadiene - (2,4) - al - (1), 5 - acetoxy - 4 - methyl-pentadiene - (2,4) - al - (1), 4 - methylhexadiene - (2,4) - al - (1), 6-dimethylamino - 4 - methyl - hexadiene - (2,4) - al - (1), 7 - ethoxy - 4 - methyl - heptatriene - (2,4,6) - al - (1), 7 - acetoxy - 4 - methyl - heptatriene - (2,4,6) - al - (1), 7 - carboxy - 4 - methyl - heptatriene - (2,4,6) - al - (1), 7 - carbethoxy - 4 - methyl - heptatriene - (2,4,6) - al - (1), 4 - methyloctatriene - (2,4,6) - al - (1), 9 - carboxy - 4,8 - dimethyl - nonatetraene - (2,4,6,8)-al-(1), 9-carbalkoxy-4,8-dimethyl-nonatetraene-(2,4,6,8)-al - (1), 4,8 - dimethyl - decatetraene - (2,4,6,8) - al - (1), 9 - carboxy - 4,9 - dimethyl - nonatetraene - (2,4,6,8) - al - (1), 13 - carboxy - 4,8,12 - trimethyl - tridecahexaene - (2,4,6,8,10,12 - al - (1), 13 - carboxy - 4,9,13 - trimethyl-tridecahexaene - (2,4,6,8,10,12) - al - (1), 4,8 - dimethyl-dodecatetraene - (2,4,8,10) - ine - (6) - dial - (1,12), 4,8-dimethyl - dodecapentaene - (2,4,6,8,10) - dial - (1,12), 2,7 - dimethyl - octadiene - (2,6) - ine - (4) - dial -(1,8), 2,7 - dimethyl - octatriene - (2,4,6) - dial - (1,8), 2,6,11,15 - tetramethylhexadecaheptaene-(2,4,6,8,10,12,14)-dial-(1,6), 2,6,11,15 - tetramethylhexadecahexaene - (1,4,6,10,12,14) - ine - (8) - dial - (1,16), 5 - (2′,6′,6′ - trimethyl-cyclohexene - (1′) - yl - (1′)) - 3 - methylpentadiene-(2,4) - al - (1), 8 - (2′,6′,6′ - trimethyl - cyclohexene-(1′) - yl - (1′)) - 6 - methyl - octatriene - (3,5,7) - one-(2), methylglyoxal dimethylacetal, methylglyoxal diethylacetal, tetrahydrofural-(2)-oxyacetone and 6-methyl-heptene-(5)-one-(2).

As proton acceptors there are especially suitable basic compounds, such as alkali or alkaline earth hydroxides, alkali or alkaline earth alcoholates and alkali or alkaline earth amides. Of the alcoholates, those which are derived from lower alcohols with up to 5 carbon atoms are preferred. Strongly basic amines and resin exchangers of the OH$\theta$ series may however also be used.

The process is advantageously carried out in a solvent which is inert under the conditions of the process. Examples are hydrocarbons, such as toluene and xylene, alcohols, such as methanol, ethanol, isopropanol, butanols, glycols, hexanol, cyclohexanol and cyclo-octanol, and also ethers, such as di-isopropyl ether, tetrahydrofurane, dimethyl-tetrahydrofurane and dioxane. Polar organic solvents, such as formamide, dimethylformamide, dimethylsulfoxide, acetonitrile and N-methylpyrrolidone, are especially suitable. In general, the said reactions also proceed surprisingly smoothly in aqueous media.

The reaction temperature depends on the nature of the components to be reacted, especially on the nature of the compounds containing carbonyl groups and the proton acceptor and lies as a rule between about −20° and +100° C., preferably between 0° and +100° C. It is recommendable that the most favorable reaction temperature in each case should be ascertained by a preliminary experiment.

The new process may for example be carried out by placing the compound containing carbonyl groups, the compound of the general Formula I and advantageously a solvent in a receptacle and introducing into the mixture the proton acceptor, either as such, dissolved or suspended, while stirring. It is equally possible first to add the proton acceptor only to the compound of the general Formula I and then to add the compound containing carbonyl groups. As a rule the reactants are used in stoichiometric amounts, but in some cases an excess or deficiency of one or other reactant may be of advantage. The reaction in general proceeds with evolution of considerable heat so that it may be necessary to cool. The reaction mixture is worked up in the usual way, for example by adding water or methanol and possibly an acid, such as acetic acid or sulfuric acid, and separation of the deposited products. If the process is to produce sensitive substances, such as beta-ionylidene acetonitrile, it is preferable to carry out the reaction in the presence of an inert gas, such as nitrogen or argon.

The advantages of the process according to this invention as compared with known processes lie in the rapid course of the reaction, in the good yields and in the almost universal applicability of the process to a great variety of initial materials. The products obtained are very pure because the phosphorus component can be separated without difficulty in the form of a salt. A special advantage of the new process resides in the fact that not only is it not necessary to use absolute solvents, but the reaction may even be carried out in aqueous solution.

The alpha,beta-unsaturated nitriles obtainable according to the process are in some cases suitable as soil ameliorants and they are intermediate products for the synthesis of dyestuffs and pharmaceuticals, and also especially for reactions in the vitamin-A series. Especially valuable intermediate products for reactions of this type are alpha-cyclohexylidenyl-cyclohexylidene-acetonitrile, 1,1-dimethoxy-2-methyl-3-cyanopropene-(2), gamma-tetrahydrofuranyloxy-beta-methyl-crotononitrile and 1,4-bis-(2'-cyano-propen-(1')-yl-(1'))-benzene, which have not hitherto been described. Many of the compounds which are obtainable according to the new process are also suitable as additives in copolymerizations.

The following examples will further illustrate this invention but the invention is not restricted to these examples. Unless otherwise specified, the parts are by weight. The parts by weight bear the same relation to the parts by volume as the gram does to the cubic centimeter.

*Example 1*

152 parts of chloracetonitrile are gradually dripped into 365 parts of triethyl phosphite heated to 150° C. The ethyl chloride formed is withdrawn through a column. After the chloracetonitrile has been added, the mixture is heated for half an hour at 180° C. and then distilled under reduced pressure. At 0.4 mm. Hg there pass over from 101° to 102° C. 262 parts of cyanomethylphosphonic acid diethyl ester (phosphonic acetonitrile) as a colorless oily liquid.

A mixture of 50 parts of a 30% solution of sodium methylate in methanol and 20 parts by volume of dimethylformamide are added with powerful stirring to a mixture of 40 parts of phosphonic acetonitrile, 40 parts of beta-ionone and 30 parts by volume of dimethylformamide so that the reaction temperature does not rise above 50° C. The reaction mixture is stirred for another hour, then adjusted to pH 7 with glacial acetic acid and 100 parts by volume of 50% methanol are added. The beta-ionylidene acetonitrile is extracted with ether, washed, dried, freed from solvent and distilled under reduced pressure. At 111° to 111.5° C. at 0.25 mm. Hg there pass over 39 parts of pure beta-ionylidene acetonitrile as a water-clear oily liquid.

*Example 2*

36 parts of benzophenone are dissolved in 50 parts by volume of dimethylformamide and then 35 parts of phosphonic acetonitrile are added. A mixture of 40 parts of an 80% solution of sodium methylate in methanol and 20 parts by volume of dimethylformamide is then slowly added to the mixture so that the temperature is about 50° C. After cessation of the reaction, the mixture is stirred for another hour, neutralized with glacial acetic acid, diluted with 200 parts by volume of water and extracted with ether. The etheral solution is washed, dried and concentrated and the residue distilled under reduced pressure.

At 0.01 mm. Hg and at 114° to 117° C. there pass over 36 parts of colorless beta,beta-diphenylacrylonitrile which rapidly solidifies to colorless crystals having the melting point 47° to 48° C.

*Example 3*

200 parts of a 30% solution of sodium methylate in methanol are dripped while stirring into a mixture of 178 parts of alpha-cyclohexylidene-cyclohexanone, 190 parts of phosphonic acetonitrile and 150 parts by volume of dimethylformamide in such a way that the reaction temperature does not exceed 50° C. After cessation of the strongly exothermic reaction, the reaction mixture is stirred for another hour, then neutralized with glacial acetic acid, 500 parts by volume of water are added and extraction with ether carried out. The etheral solution is dried, washed, concentrated and the residue distilled under reduced pressure. At 0.1 mm. Hg there pass over between 110° and 114° C. 173 parts of alpha-cyclohexylidenyl-cyclohexylidene acetonitrile as a viscous colorless oil.

*Example 4*

118 parts of methylglyoxaldimethylacetal and 177 parts of cyanomethylphosphonic acid diethyl ester are mixed with 50 parts by volume of methanol and 200 parts by volume of distilled water. Into this mixture while stirring powerfully at 0° C. there is dripped a solution of 41 parts of sodium hydroxide in 200 parts by volume of distilled water. After the reaction has ended, the whole is stirred for another hour and then extracted with ether. The etheral solution is washed, dried and concentrated and the residue distilled. At 2 mm. Hg and 63° to 64° C. there pass over 125 parts of 1,1-dimethoxy-2-methyl-3-cyano-propene-(2) (beta-formylcrotononitrile dimethyl acetal) as a colorless liquid.

*Example 5*

72 parts of tetrahydrofuryloxyacetone and 90 parts of cyanomethylphosphonic acid diethyl ester are mixed with 100 parts by volume of water and cooled to 0° C. While stirring powerfully, a solution of 30 parts of potassium hydroxide in 100 parts of water is dripped in in such a way that the internal temperature does not rise above 0° C. After the addition of the caustic potash, the whole is stirred for another hour at room temperature and then extracted with ether. The etheral solution is washed, dried and concentrated. The residue is distilled under reduced pressure. At 0.4 mm. Hg 66 parts of gamma-tetrahydrofuryloxy-beta-methyl-crotononitrile pass over between 87° and 87.5° C. as a colorless liquid.

*Example 6*

53 parts of benzaldehyde and 90 parts of cyanomethylphosphonic acid diethyl ester are mixed with 350 parts by volume of methanol. While stirring powerfully at 0° C. there is dripped in a solution of 25 parts of caustic soda in 100 parts of volume of water. After the alkali has been added, the mixture is stirred for another hour at room temperature, adjusted to pH 7 with glacial acetic acid, diluted with 500 parts of volume of water and extracted with methylene chloride. The methylene chloride solution is washed with water, dried over sodium sulfate and then concentrated. The residue is distilled under reduced pressure. 47 parts of cinnamic nitrile pass over as a colorless liquid at 0.2 mm. Hg between 81° and 82° C.

*Example 7*

58 parts of propionaldehyde and 180 parts of cyanomethylphosphonic acid diethyl ester are mixed with 150 parts by volume of water and 150 parts by volume of methanol. While stirring at 0° C., a solution of 45 parts of caustic soda in 200 parts by volume of water is dripped in. After the addition of alkali, the while is stirred for another hour at room temperature, diluted with 200 parts by volume of water, neutralized with glacial acetic acid and extracted with methylene chloride. The methylene chloride solution is washed with water, dried over sodium sulfate and then concentrated. The residue is distilled under reduced pressure. 67 parts of gamma methylcrotonic nitrile pass over as a colorless liquid at 90 mm. Hg at from 68° to 72° C.

*Example 8*

38 parts of chloracetonitrile are dripped gradually into 115 parts of tripropyl phosphite heated to 140° to 150° C. The propyl chloride formed is distilled off through a short column. As soon as all the chloracetonitrile has been added, the reaction temperature is raised to 180° C. and kept there for another hour. The low boiling fraction is then removed under reduced pressure.

The cyanomethylphosphonic acid dipropyl ester which remains in the residue is dissolved together with 85 parts of benzophenone in 250 parts of volume of benzene. This solution is dripped so rapidly while stirring into a suspension of 22 parts of sodamide in 250 parts by volume of benzene that the mixture is kept at 50° C. by the heat set free. As soon as the reaction mixture has cooled to room temperature water is carefully added and neutralization effected with glacial acetic acid. The benzene solution is washed several times with water, dried over sodium sulfate and concentrated. The residue is distilled under reduced pressure. 82 parts of colorless beta,beta-diphenyacrylonitrile pass over at 0.01 mm. Hg and from 114° to 117° C., and rapidly solidify to colorless crystals of the melting point 47° to 48° C.

*Example 9*

A solution of potassium-tert.-butylate in tert. butanol which has been prepared by dissolving 39 parts of potassium in 400 parts by volume of tert. butanol is dripped while stirring into a mixture of 178 parts of alpha-cyclohexylidene-cyclohexanone, 190 parts of phosphonic acetonitrile and 150 parts by volume of dimethylformamide. The addition of the potassium-tert.-butylate is regulated so that the reaction temperature does not exceed 50° C. As soon as the reaction mixture has cooled to room temperature, 500 parts by volume of water are added, neutralization is effected with glacial acetic acid and the whole extracted with ether. The ethereal solution is washed with water, dried over sodium sulfate and concentrated. The residue is distilled under reduced pressure. At 0.1 mm. Hg and between 110° and 114° C. there pass over 165 parts of alpha-cyclohexylidenyl-cyclohexylidene acetonitrile as a viscous oil.

*Example 10*

89 parts of cyanomethylphosphonic acid diethyl ester are added at room temperature to a solution of potassium-tert.-butylate which has been prepared from 22 parts of potassium and 500 parts by volume of tert. butanol. After stirring for half an hour, 70 parts of methyl iodide are dripped in. The mixture is stirred for another 12 hours at room temperature. The potassium iodide formed is precipitated by adding some water. The salt is filtered off, the solvent withdrawn through a column and the residue distilled in vacuo.

71 parts of alpha-methylcyanomethylphosphonic acid diethyl ester pass over as a colorless oil at 0.3 mm. Hg between 87° and 89° C.

To a solution of 40 parts of this ester and 13 parts of terephthalaldehyde in 50 parts by volume of dimethylformamide there are added 40 parts of a 30% solution of sodium methylate in methanol. By the resultant exothermic reaction there is formed 1,4-bis-(2'-cyanopropen-(1')-yl-(1'))-benzene which crystallizes out from the reaction mixture. The product is diluted with 100 parts by volume of methanol, adjusted to pH 7 with glacial acetic acid and the reaction product filtered off by suction. By dissolution in and reprecipitation from ethyl acetate, 13 parts of the product are obtained as a cis-trans-isomer mixture in the form of colorless leaflets of the melting point 132° to 144° C.

*Example 11*

110 parts of gamma-brom-beta-methylcrotononitrile are gradually dripped into 130 parts of triethyl phosphite heated to 140° C. The ethyl bromide formed is withdrawn through a column. After the bromide has been added, the mixture is heated for another half an hour at 180° C. and then distilled under reduced pressure. 108 parts of 1-cyano-2-methyl-propene-(1)-diethyl-phosphonate-(3) pass over at 0.01 mm. Hg from 105° to 107° C. as a colorless oily liquid.

20 parts of a 30% solution of sodium methylate in methanol are added with powerful stirring to a solution of 15 parts of para-dimethylaminobenzaldehyde and 24 parts of 1-cyano-2-methyl-proene-(1)-diethylphosphonate-(3) in 50 parts by volume of dimethylformamide. 1-cyano-2-methyl-4-(para-dimethylamino-phenyl)-butadiene-(1,3) is formed in an exothermic reaction. The reaction product is stirred for another hour, then adjusted to pH 7 with glacial acetic acid and diluted with 50 parts by volume of methanol. The reaction product is filtered off by suction and recrystallized from ethyl acetate. 17 parts of 1-cyano-2-methyl-4-(para-dimethylamino - phenyl)-butadiene-(1,3) are obtained as yellow-green fluorescent crystals of the melting point 190° to 191° C.

*Example 12*

76 parts of chloracetonitrile are gradually dripped into 220 parts of phenyl diethoxy phosphine heated to 140° C. The ethyl chloride formed is withdrawn through a column. After all the chloracetonitrile has been added, the mixture is heated for half an hour at 180° C. and then distilled under reduced pressure. At 0.5 mm. Hg there pass over between 162° and 164° C. 141 parts of cyanomethyl-phenylphosphinic acid ethyl ester as a yellowish viscous oil.

A mixture of 45 parts of a 30% solution of sodium methylate in methanol and 20 parts by volume of dimethylformamide is added with powerful stirring to a mixture of 38 parts of beta-ionone, 46 parts of cyanomethylphenylphosphinic acid ethyl ester and 30 parts by volume of dimethylformamide in such a way that the reaction temperature does not rise above 50° C.

The reaction mixture is stirred for another hour, then adjusted to pH 7 with glacial acetic acid and 100 parts by volume of 50% methanol are added. The beta-ionylidene-acetonitrile is extracted with ether, washed, dried, freed from solvent and distilled under reduced pressure. 37 parts of pure beta-ionylidene-acetonitrile pass over at 111° to 112° C. at 0.3 mm. Hg as a water-clear oily liquid.

*Example 13*

20 parts of a 30% sodium methylate solution in methanol are slowly added while stirring powerfully in a nitrogen atmosphere to a mixture of 22 parts of 1-cyano-2-methyl-propene-(1)-diethylphosphonate-(3), 22 parts of beta-ionyl-idene acetaldehyde and 50 parts by volume of dimethylformamide. The reaction temperature is maintained at 20° C. by cooling. After all the alkali has been added, the mixture is stirred for another hour, diluted with 50 parts by volume of methanol, neutralized with glacial acetic acid, diluted with 100 parts by volume of water and extracted with ether. The ethereal solution is washed with water, dried and concentrated. The residue is distilled in a high vacuum. At 0.001 mm. Hg and a bath temperature of 170° to 180° C. there pass over 23 parts of vitamin-A acid nitrile in the form of an orange-yellow viscous oil, which partly solidifies after standing for some time. By recrystallization from methanol there is obtained crystalline vitamin-A acid nitrile of the melting point 50° to 51° C., $\lambda_{max}$ 359 millimicrons (in methanol), $\epsilon = 46,900$.

We claim:

1. A process for the production of alpha,beta-unsaturated nitriles which comprises reacting a carbonyl compound selected from the group consisting of aldehydes and ketones at a temperature between about −20° C. and +100° C. in the presence of a proton acceptor with a compound of the formula

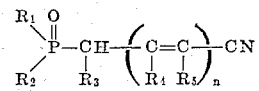

in which $R_1$ represents an alkoxy radical containing 1 to 4 carbon atoms, in which $R_2$ represents a substituent selected from the group consisting of alkoxy radicals containing 1 to 4 carbon atoms, alkyl radicals containing 1 to 4 carbon atoms and phenyl, in which $R_3$, $R_4$ and $R_5$ represent a member selected from the group consisting of hydrogen and alkyl radicals containing 1 to 4 carbon atoms, and in which $n$ is an integer of from 0 to 4, inclusive.

2. A process as claimed in claim 1 which comprises the use of a proton acceptor selected from the group consisting of alkali and alkaline earth hydroxides, alkali and alkaline earth alcoholates and alkali and alkaline earth amides.

3. A process as claimed in claim 1 which comprises carrying out the reaction in a polar organic solvent which is inert under the conditions of the process.

References Cited in the file of this patent

Karrer: Organic Chemistry, Second English Edition, 1946, pages 154–5 and 495.

Bergmenn: Chemistry of Acetylene and Related Compounds, Interscience, Inc., 1948, page 80.

UNITED STATES PATENT OFFICE
CERTIFICATE OF CORRECTION

Patent No. 3,157,660                  November 17, 1964

Walter Stilz et al.

It is hereby certified that error appears in the above numbered patent requiring correction and that the said Letters Patent should read as corrected below.

Column 3, line 1, for "later" read -- latter --; line 52, for "cirtal" read -- citral --; column 6, line 58, for "while" read -- whole --; column 8, line 2, for "-proene-" read -- -propene- --; column 10, line 8, for "Bergmenn" read -- Bergmann --.

Signed and sealed this 4th day of May 1965.

(SEAL)
Attest:

ERNEST W. SWIDER                                EDWARD J. BRENNER
Attesting Officer                                     Commissioner of Patents